(12) United States Patent
Scaife (10) Patent No.: US 10,348,734 B2
(45) Date of Patent: *Jul. 9, 2019

(54) SECURITY BYPASS ENVIRONMENT FOR CIRCUMVENTING A SECURITY APPLICATION IN A COMPUTING ENVIRONMENT

(71) Applicant: Walmart Apollo, LLC, Bentonville, AR (US)

(72) Inventor: Walter N. Scaife, Fayetteville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/852,494

(22) Filed: Dec. 22, 2017

(65) Prior Publication Data

US 2018/0124058 A1  May 3, 2018

Related U.S. Application Data

(63) Continuation of application No. 15/429,921, filed on Feb. 10, 2017, now Pat. No. 9,888,009, which is a
(Continued)

(51) Int. Cl.
*H04L 29/06* (2006.01)
*G06F 21/51* (2013.01)
(Continued)

(52) U.S. Cl.
CPC ............ *H04L 63/101* (2013.01); *G06F 21/31* (2013.01); *G06F 21/51* (2013.01); *G06F 21/564* (2013.01);
(Continued)

(58) Field of Classification Search
CPC ..... H04L 63/101; H04L 63/083; H04L 63/20; H04L 63/105; G06F 21/564; G06F 21/31;
(Continued)

(56) References Cited

U.S. PATENT DOCUMENTS 5,678,041 A    10/1997  Baker et al.
6,725,382 B1   4/2004   Thompson et al.
(Continued)

FOREIGN PATENT DOCUMENTS

WO    2012/135192 A2   10/2012

OTHER PUBLICATIONS

International Preliminary Report on Patentability for International Application No. PCT/US13/071013, dated May 26, 2015.
(Continued)

*Primary Examiner* — Matthew Smithers
(74) *Attorney, Agent, or Firm* — McCarter & English, LLP; David R. Burns (57) ABSTRACT

Exemplary embodiments of the present disclosure are directed to performing an operation in a computing environment that is prohibited by a security application governing the computing environment. Exemplary embodiments can generate a security bypass environment in a computing environment governed by the security application to provide a bypass to the security application. In exemplary embodiments, a request to perform the operation can be received via the security bypass environment and the operation can be performed through the security bypass environment in response to satisfaction of access control criteria specified for the security bypass environment so that the performance of the operation bypasses the security application.

24 Claims, 6 Drawing Sheets

Related U.S. Application Data continuation of application No. 14/570,686, filed on Dec. 15, 2014, now Pat. No. 9,600,660, which is a continuation of application No. 13/683,864, filed on Nov. 21, 2012, now Pat. No. 8,914,857.

(51) Int. Cl.
*G06F 21/31* (2013.01)
*G06F 21/56* (2013.01)

(52) U.S. Cl.
CPC ............ *H04L 63/083* (2013.01); *H04L 63/20* (2013.01); *G06F 2221/033* (2013.01); *G06F 2221/2113* (2013.01); *H04L 63/105* (2013.01)

(58) Field of Classification Search
CPC ............... G06F 21/51; G06F 2221/033; G06F 2221/2113
See application file for complete search history.

(56) References Cited

U.S. PATENT DOCUMENTS

| | | | |
|---|---|---|---|
| 6,928,455 B2 | 8/2005 | Dougu et al. | |
| 8,615,554 B1 | 12/2013 | King et al. | |
| 8,914,857 B2 * | 12/2014 | Scaife | H04L 63/20 726/5 |
| 8,950,007 B1 | 2/2015 | Teal et al. | |
| 9,141,786 B2 | 9/2015 | Edery et al. | |
| 9,152,790 B1 | 10/2015 | Glick et al. | |
| 9,317,690 B2 | 4/2016 | Sallam | |
| 9,600,660 B2 * | 3/2017 | Scaife | H04L 63/20 |
| 9,888,009 B2 * | 2/2018 | Scaife | H04L 63/20 |
| 2003/0226007 A1 | 12/2003 | Olsen et al. | |
| 2004/0078591 A1 | 4/2004 | Teixeira et al. | |
| 2004/0199763 A1 | 10/2004 | Freund | |
| 2005/0108516 A1 | 5/2005 | Balzer et al. | |
| 2005/0289072 A1 | 12/2005 | Sabharwal | |
| 2006/0179296 A1 | 8/2006 | Bartlett et al. | |
| 2007/0271220 A1 | 11/2007 | Carter | |
| 2007/0300286 A1 | 12/2007 | Judge | |
| 2008/0016339 A1 | 1/2008 | Shukla | |
| 2008/0148340 A1 | 6/2008 | Powell et al. | |
| 2008/0271135 A1 | 10/2008 | Krell et al. | |
| 2009/0158430 A1 | 6/2009 | Borders | |
| 2009/0325615 A1 | 12/2009 | McKay et al. | |
| 2010/0153704 A1 | 6/2010 | Winslow | |
| 2010/0199357 A1 | 8/2010 | Hoffman et al. | |
| 2012/0023593 A1 | 1/2012 | Puder et al. | |
| 2012/0310983 A1 | 12/2012 | Mittal et al. | |
| 2013/0054962 A1 | 2/2013 | Chawla et al. | |
| 2013/0060943 A1 | 3/2013 | Davis et al. | |
| 2013/0219484 A1 | 8/2013 | Touboul | |
| 2013/0263260 A1 | 10/2013 | Mahaffey et al. | |
| 2013/0268753 A1 | 10/2013 | Vanderpol et al. | |

OTHER PUBLICATIONS

International Search Report and Written Opinion of the International Searching Authority on International Application No. PCT/US13/071013, dated May 20, 2014.

Kim et al., "A Bypassing Security Model for Anonymous Bluetooth Peers," 2005, IEEE, pp. 310-315.

* cited by examiner

SECURITY BYPASS ENVIRONMENT FOR CIRCUMVENTING A SECURITY APPLICATION IN A COMPUTING ENVIRONMENT

CROSS REFERENCE TO RELATED APPLICATIONS

This application is a continuation of U.S. patent application Ser. No. 15/429,921, filed on Feb. 10, 2017 which is continuation of U.S. Pat. No. 9,600,660, filed on Dec. 15, 2014 which is continuation of U.S. Pat. No. 8,914,857, filed on Nov. 21, 2012, the contents of which is incorporated by reference herein in its entirety.

BACKGROUND

Enterprises often implement security programs to restrict or limit the permissions and/or access rights of the users of the enterprises' computers and/or networks. For example, conventional security programs can be programmed to prevent a user of the network from installing and/or executing unauthorized software applications unless the user is an administrator of the network having certain permissions granted by the security program.

Some conventional security programs implement "whitelisting" and/or "blacklisting" schemes to determine which software applications can be installed and/or executed by the users governed by the security program. Whitelisting-based security technologies work opposite traditional blacklisting-based technologies like anti-virus. Particularly, blacklisting schemes generate a "blacklist" of software application that cannot be installed and/or executed by a computer that is governed by the blacklisting scheme. In contrast to blacklisting schemes, whitelisting schemes prevent all new software applications from executing on a system unless it has first been added to a whitelist and/or identified as a "trusted" program. Software applications or changes, modifications, or updates thereto that are prohibited by the security program can be referred to as being "out-of-band."

Conventional computer and/or network security solutions often do not have the flexibility to allow users to install, update, modify, and/or execute out-of-band software on their systems, e.g., for troubleshooting or single-system installs. For example, conventional security solutions attempt to support out-of-band software by either fully allowing a user to perform whatever actions they wish or disabling the product altogether. These conventional approaches to out-of-band software can result in an enterprise being vulnerable to unauthorized access and attacks that can compromise their network and/or data.

SUMMARY

Exemplary embodiments of the present disclosure are directed to a security bypass environment configured and/or programmed to provide a gateway in a computing environment governed by a security application through which unauthorized operations can be implemented that would otherwise be prohibited by the security application. The security bypass environment can be subject to the security application and the security application can be configured to allow the security bypass environment to be generated. In some embodiments, the security bypass environment can be programmed to exploit whitelisting schemes of a security application by performing the unauthorized operations through the security bypass environment such that the unauthorized operations receive (e.g. inherit) the security rights of the security bypass environment and circumvent the security application. Exemplary embodiments of the present disclosure advantageously allow, for example, untrusted programs to run by passing the user and the executable through one or more (configurable) gates implementing one or more access control procedures including, but not limited to, user authorization, offloaded virus scanning, and one-time password authentication.

In an exemplary embodiment, a method of performing an operation in a computing environment governed by a security application is disclosed. The method includes generating a security bypass environment in the computing environment governed by the security application. The security bypass environment is programmed to provide a bypass to the security application. The method also includes receiving a request to perform an operation via the security bypass environment, performance of the operation being prohibited by the security application and performing the operation through the security bypass environment in response to satisfaction of access control criteria specified for the security bypass environment, performance of the operation bypassing by the security application.

In another exemplary embodiment, a system for performing an operation in a computing environment is disclosed. The computing environment includes a plurality of computing devices configured to be communicatively coupled via a communications network, wherein the computing devices are governed by a security application. A processing device associated with one of the computing devices is programmed to generate a security bypass environment in the computing environment. The processing device is programmed to configure the security bypass environment to provide a bypass to the security application. The processing device is also programmed to receive a request to perform an operation via the security bypass environment, performance of the operation being prohibited by the security application and perform the operation through the security bypass environment in response to satisfaction of access control criteria specified for the security bypass environment, performance of the operation bypassing by the security application.

In yet another embodiment, a non-transitory computer-readable storage device configured to store instructions executable by a processing device is disclosed. Execution of the instructions causes the processing device to implement a method of performing an operation in a computing environment, wherein the method includes generating a security bypass environment in the computing environment governed by the security application. The security bypass environment is programmed to provide a bypass to the security application. The method implemented in response to execution of the instruction further includes receiving a request to perform an operation via the security bypass environment, performance of the operation being prohibited by the security application and performing the operation through the security bypass environment in response to satisfaction of access control criteria specified for the security bypass environment, performance of the operation bypassing by the security application.

Other objects and features will become apparent from the following detailed description considered in conjunction with the accompanying drawings. It is to be understood, however, that the drawings are designed as an illustration only and not as a definition of the limits of the invention.

DESCRIPTION OF EXEMPLARY EMBODIMENTS

Exemplary embodiments of the present disclosure are directed to performing an operation in a computing environment that is prohibited by a security application governing the computing environment. Exemplary embodiments can generate a security bypass environment in a computing environment governed by the security application to provide a bypass to the security application. In exemplary embodiments, a request to perform the operation can be received via the security bypass environment and the operation can be performed through the security bypass environment in response to satisfaction of access control criteria specified for the security bypass environment so that the performance of the operation bypasses the security application.

As used herein, the term "security" refers to computing security including, but not limited to protection from execution of unauthorized, undesirable, and/or malicious software applications in a computing environment, virus protection, malware protection, cyber security, and/or any other suitable aspects of computing security.

As used herein, the term "gate" refers to a condition and/or event to be satisfied before an action can be performed and the term "gating" refers to preventing a performance of an action.

Figure 1:
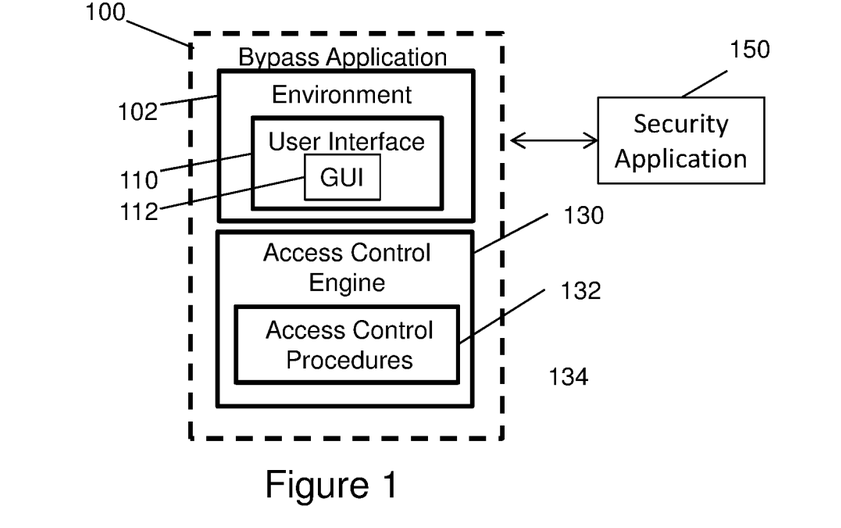
FIG. 1 is a block diagram of an exemplary bypass application programmed to create an environment for circumventing a security application.

FIG. 1 is a block diagram of an exemplary security bypass application 100 (hereinafter "application 100") configured and/or programmed to generate a security bypass environment 102 (hereinafter "environment 102") in a computing environment. In exemplary embodiments, the application 100 can be implemented using one or more computing devices. An exemplary computing device suitable for implementing embodiments of the application 100 is shown, for example, in FIG. 6.

Execution of the application 100 can be subject to permission from a security application 150 governing the computing environment. For example, an enterprise security application, such as security applications developed by McAfee, Norton, Computer Associates (CA), and/or Trend-Micro can be implemented by an enterprise to monitor and/or manage activities of computing devices in the enterprise's computer network. The security application can perform virus/malware scans (in real-time and/or periodically); prohibit installation, modification, updating, and/or execution of unauthorized software by computing devices in the enterprise's network; and/or identify and permit trusted software to be installed, modified, updated, and/or executed on or by a computing device in the enterprise's network. In some embodiments, software applications that cannot be identified as trusted are prohibited such that the software applications are considered an unauthorized software application (e.g., out-of-band) and installation and/or execution of the unauthorized software application is prohibited by the security application. As one example, trusted software applications can be can be identified by inclusion of the trusted software applications in a whitelist maintained by the security application. As another example, trusted software applications can be identified by digital certificates provided by the trusted software application.

The environment 102 created by an execution of the application 100 can be programmed to perform one or more security bypass procedures to facilitate performance of an operation otherwise prohibited by the security application. The environment 102 can include a user interface 110 and an access control engine 130. The security bypass environment 102 operates as a gateway to programmatically facilitate authorized circumvention of the security application to permit performance of one or more operations that would conventionally be blocked by the security application. For example, operations performed via the security bypass environment 102 can include installation, updating, and/or execution of software applications that have not been allowed by the security application.

In exemplary embodiments, the environment 102 can be programmed and/or include executable code that exploits relationship schemes of the security application to augment and/or bypass the existing security protocol. For example, in relationship scheme, the trusted application can be identified by the security system as an application that can be executed in the computing environment (e.g., via a whitelist) such that any application called and/or implemented by the trusted application 100 during its operation receives security rights and permissions of the trusted application 100 such that security application 150 allows the application to be executed. Using this approach, applications called and/or implemented through the environment 102 can be run upon satisfying one or more of the access controls 130 by receiving some or all of the permissions and/or rights of the trusted application 100. In some embodiments, the relationship scheme can use inherency such that an instance of the application to be executed inherits the security rights and permissions of the application 100.

In exemplary embodiments, the user interface 110 can be programmed and/or include executable code to provide a graphical user interface (GUI) 112 through which a user can interact with the environment 102. As an example, in some embodiments, the user interface 110 can be a command prompt displayed to a user. The GUI 112 displayed to the user can be programmed and/or configured to receive information from the user and/or can output information to the user. For example, the user interface 110 can be programmed and/or include executable code to receive one or more requests or commands from a human user, such as one or more commands for performing one or more operations, such as executing one or more untrusted software applications and/or processes. The request can include a passcode and/or a user identifier that can be used by the application 100 to determine whether the requested operation can be performed via the environment 102. In exemplary embodiments, the user interface 110 can programmed and/or include executable code to interface with the access control engine 130.

The access control engine 130 can programmed and/or configured to implement access control procedures 132 to programmatically facilitate one or more access control procedures 132 to be satisfied before the untrusted software application can be installed and/or executed by a computing device by circumventing the security application implemented in the enterprise network. The access control procedures 132 executed by the access control engine 130 can include an identification procedure for determining an identity of a user, a verification procedure, a virus detection procedure for offloaded virus scanning, one-time password authentication, and/or any other access control procedures suitable for gating performance of the one or more operations included in a received request. In some embodiments, the requested operation can be run a single time by passing the identity of the user and the executable through the (configurable) access control procedures (gates) so that each time the user performs the requested operation, the user must use the security bypass environment and must satisfy the access control procedures.

Figure 2:
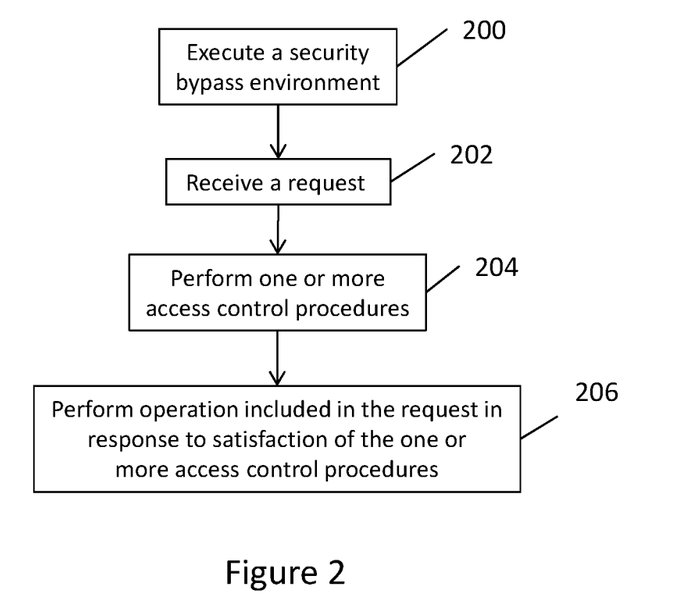
FIG. 2 is a flowchart of an exemplary security bypass procedure implemented by an execution of embodiments of the application of FIG. 1.

FIG. 2 is a flowchart of an exemplary security bypass procedure that can be programmatically implemented by an exemplary embodiment of the present disclosure to circumvent a security application governing a computing environment. To begin, the security bypass environment can be programmatically executed subject to the security application (step 200). In an exemplary embodiment, the security application can be coded to include a whitelist identifying applications that are allowed to run in the computing environment and a security bypass application from which the security bypass environment is programmatically executed can be included in the whitelist. The security bypass application can reside at the user's client device and/or can reside on a server remote to the client device.

Once the security bypass environment has been generated, a request can be received in the security bypass environment via a user interface (step 202). The request can be a request to perform one or more operations, such as, for example, a request for execution of an untrusted/unauthorized software application (e.g., a software application prohibited by the security application). In an exemplary embodiment, the untrusted application can be prohibited because the untrusted application is not identified in the whitelist maintained by the security application. In exemplary embodiments, the request can include one or more passcodes that can be verified by an access control procedure before the one or more operations can be performed. The passcodes can be programmatically generated and/or distributed to users for use with the security bypass environment. In exemplary embodiments, the passcode can be configured and/or programmed to expire in response to one or more events including, for example, a time period, a number of times the passcodes have been used, and/or in response to any other suitable event(s).

One or more access control procedures are programmatically performed in the security bypass environment in response to the request (step 204). The one or more operations, e.g., execution of the untrusted software application, are performed upon satisfaction of the one or more access control procedures (step 206). For example, the untrusted software application can be executed in response to satisfaction of the one or more access control procedures. In an exemplary embodiment, the untrusted software application can be executed through or in the security bypass environment and the untrusted software application can receive (e.g., inherit) the security rights and permissions of the security bypass application so that the security application allows the untrusted software application to be executed without requiring the untrusted software application to be included in the whitelist.

Figure 3:
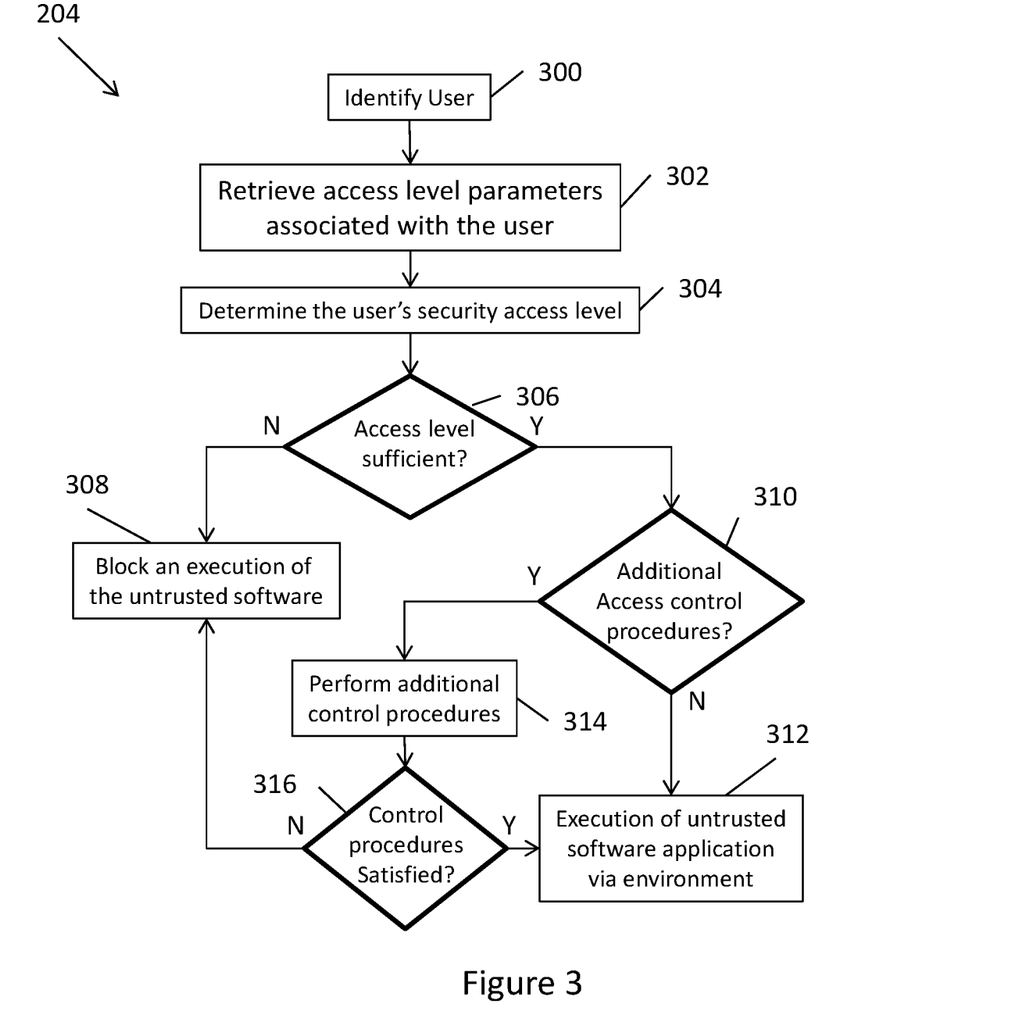
FIG. 3 is a flowchart of an exemplary access control procedure that can be programmatically implemented in response to a request received in the security bypass environment.

FIG. 3 is a flowchart of an exemplary access control procedure that can be programmatically implemented in response to a request received in the security bypass environment. To begin, an identity of the user submitting the request can be determined (step 300). In exemplary embodiments, the identity of the user can be determined based on a user identifier, e.g., a user name associated with the user, an Internet Protocol (IP) and/or Media Access Control (MAC) address that can be included in the request for embodiments implemented in a server-client environment, an/or any other identifiers that are suitable for identifying a user.

Once the user has been identified, the security bypass environment can be programmed to retrieve access level parameters associated with the user, e.g., user, administrator, guest, etc. (step 302), and can determine if the access level of the user satisfies a threshold access level specified in the security bypass environment (step 304). If the access level is insufficient (step 306), the requested operation is blocked by the security bypass environment (e.g., execution of the untrusted software application prohibited) (step 308). If the access level is sufficient (step 306), the security bypass environment determines whether there are additional access control procedures. The access level of the user can be compared to the retrieved access level parameters to determine if the access level is sufficient. If there are no further access control procedures (step 310), the requested operation is performed (e.g., untrusted software is executed) (step 312). If there are additional access control procedures to be performed (step 310), the additional access control procedures are performed (step 314). If one or more of the additional control procedures are not satisfied (step 316), performance of the operation is blocked by the security bypass environment (step 308). If the one or more additional access control procedures are satisfied (step 316), the requested operation is performed (step 312).

Figure 4:
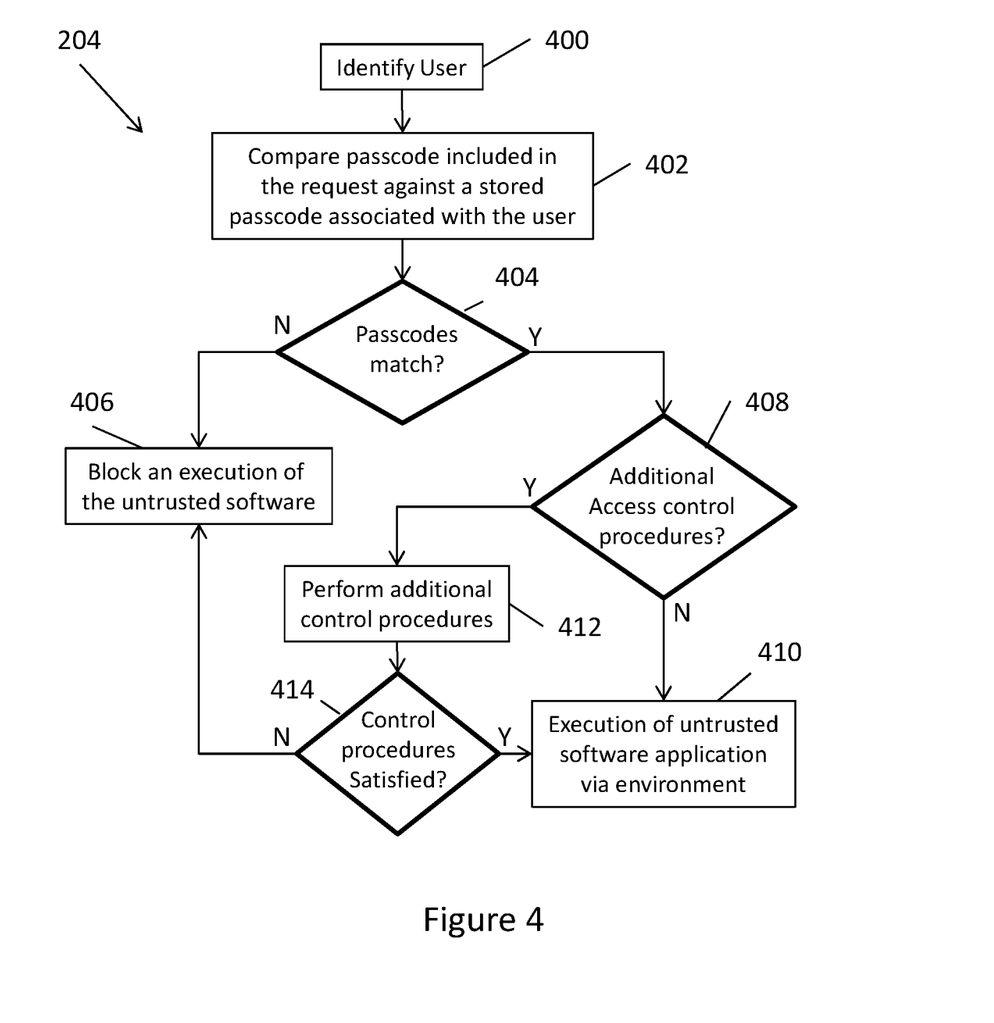
FIG. 4 is a flowchart of another exemplary access control procedure that can be programmatically implemented in response to a request received in the security bypass environment.

FIG. 4 is a flowchart of another exemplary access control procedure that can be programmatically implemented in response to a request received in the security bypass environment. To begin, an identity of the user submitting the request can be determined (step 400). In exemplary embodiments, the identity of the user can be determined based on a user identifier, e.g., a user name associated with the user, an Internet Protocol (IP) and/or Media Access Control (MAC) address that can be included in the request for embodiments implemented in a server-client environment, an/or any other identifiers that are suitable for identifying a user.

Once the user has been identified, the security bypass environment can be programmed to compare the passcode included in the request with a passcode associated with the identified user (step 402). In some embodiments, the passcode can be associated with a group of users having a specified access level such that users of different access levels have different passcodes and the user's access level it identified to determine which passcode to retrieve for comparison with the passcode included in the request. In some embodiments, the passcode can be user independent such that the passcode is not related to the user. As an example, the passcode can be distributed to multiple users such that each user uses the same passcode or a set of passcodes can be generated such that different passcodes can be distributed to different users, but the security bypass environment can be programmed to accept any passcode from the set of passcodes from any user.

If the passcode included in the request and the retrieved passcode do not match (step 404), the requested operation is blocked by the security bypass environment (e.g., execution of the untrusted software application prohibited) (step 406). If the passcode included in the request and the retrieved passcode match (step 404), the security bypass environment determines whether there are additional access control procedures. If there are no further access control procedures (step 408), the requested operation is performed (e.g., untrusted software is executed) (step 412). If there are additional access control procedures to be performed (step 408), the additional access control procedures are performed (step 412). If one or more of the additional control procedures are not satisfied (step 414), performance of the operation is blocked by the security bypass environment (step 406). If the one or more additional access control procedures are satisfied (step 414), the requested operation is performed (step 410).

Figure 5:
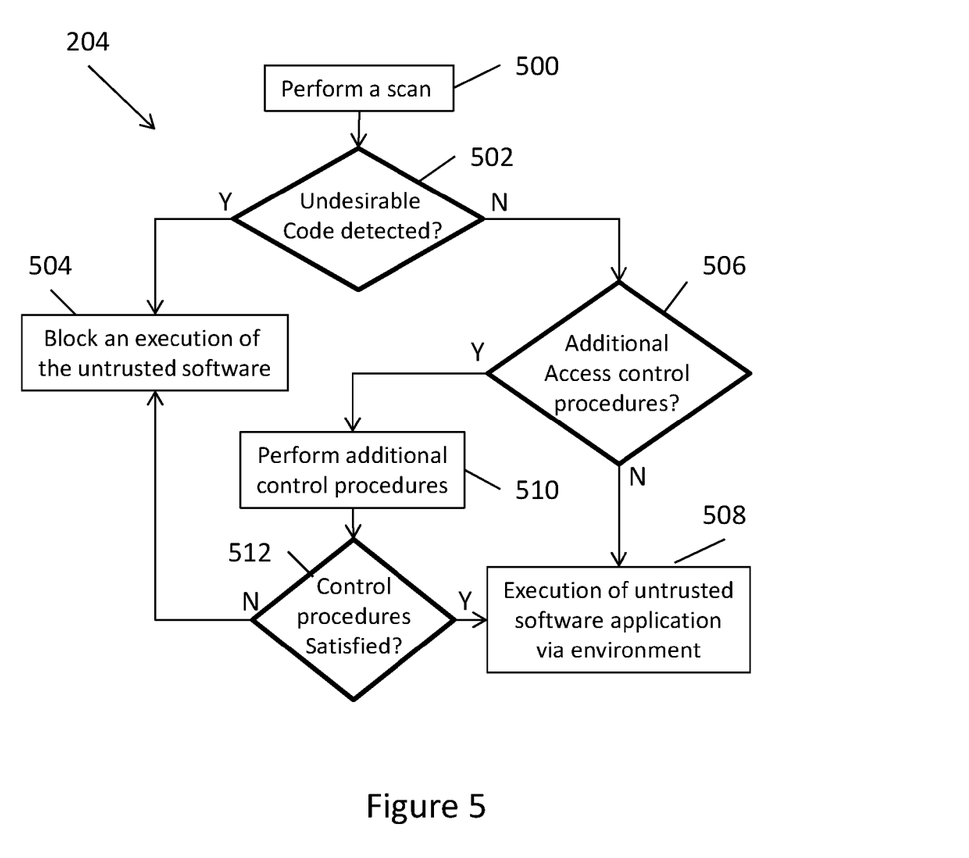
FIG. 5 is a flowchart of another exemplary access control procedure that can be programmatically implemented in response to a request received in the security bypass environment.

FIG. 5 is a flowchart of another exemplary access control procedure that can be programmatically implemented in response to a request received in the security bypass environment. For embodiments in which the request includes a request to install and/or execute an untrusted software application, the security bypass environment can be programmed and/or configured to initiate and/or perform a virus scan with respect to the untrusted software application (step 500). For example, the security bypass environment can be programmed and/or configured to interface with the security application to instruct the security application to scan computer files associated with the untrusted security application for viruses, malware, Trojan horses, and/or any other undesirable code.

If undesirable code is detected (step 502), the requested operation is blocked by the security bypass environment (e.g., execution of the untrusted software application prohibited) (step 504). If undesirable code is not detected (step 502), the security bypass environment determines whether there are additional access control procedures. If there are no further access control procedures (step 506), the requested operation is performed (e.g., untrusted software is executed) (step 508). If there are additional access control procedures to be performed (step 506), the additional access control procedures are performed (step 510). If one or more of the additional control procedures are not satisfied (step 512), performance of the operation is blocked by the security bypass environment (step 504). If the one or more additional access control procedures are satisfied (step 512), the requested operation is performed (step 508).

Figure 6:
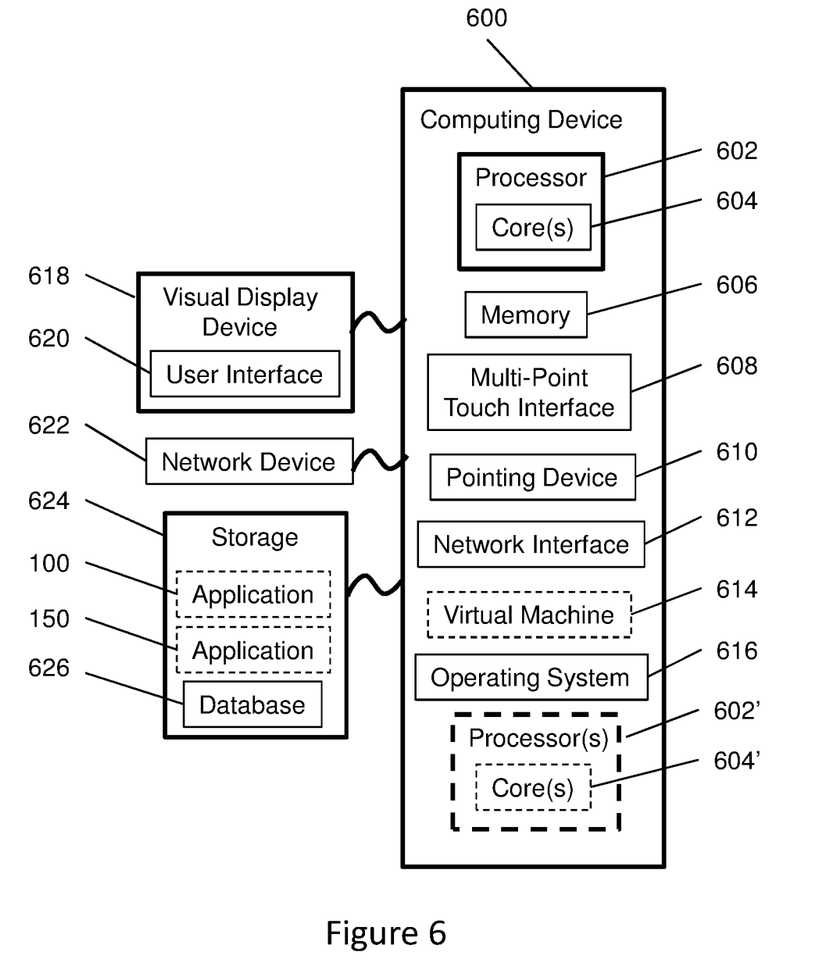
FIG. 6 is a block diagram of an exemplary computing device for executing embodiments of the bypass application to implement a security bypass environment.

FIG. 6 is a block diagram of an exemplary computing device 600 that may be used to implement exemplary embodiments of the application 100. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the computing device 600 may store com-puter-readable and computer-executable instructions or software for implementing exemplary embodiments of the application 100. The computing device 600 also includes configurable and/or programmable processor 602 and associated core 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' may each be a single core processor or multiple core (604 and 604') processor.

Virtualization may be employed in the computing device 600 so that infrastructure and resources in the computing device may be shared dynamically. A virtual machine 614 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof.

A user may interact with the computing device 600 through a visual display device 618, such as a computer monitor, which may display one or more user interfaces 620 that may be provided in accordance with exemplary embodiments. The computing device 600 may include other I/O devices for receiving input from a user, for example, a keyboard or any suitable multi-point touch interface 608, a pointing device 610 (e.g., a mouse). The keyboard 608 and the pointing device 610 may be coupled to the visual display device 618. The computing device 600 may include other suitable conventional I/O peripherals.

The computing device 600 may also include one or more storage devices 624, such as a hard-drive, CD-ROM, or other computer readable media, for storing data and computer-readable instructions and/or software that implement exemplary embodiments of the application 100 described herein. Exemplary storage device 624 may also store instructions and/or software that implements the security application 150 and may also store one or more databases for storing any suitable information required to implement exemplary embodiments. For example, exemplary storage device 624 can store one or more databases 626 for storing information, such as information corresponding to one or more commands, operations, passcodes, user identifiers, and/or any other information to be used by embodiments of the application 100. The databases may be updated by manually or automatically at any suitable time to add, delete, and/or update one or more items in the databases.

The computing device 600 can include a network interface 612 configured and/or programmed to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 may include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 600 may run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 616 may be run in native mode or emulated mode. In an exemplary embodiment, the operating system 616 may be run on one or more cloud machine instances.

Figure 7:
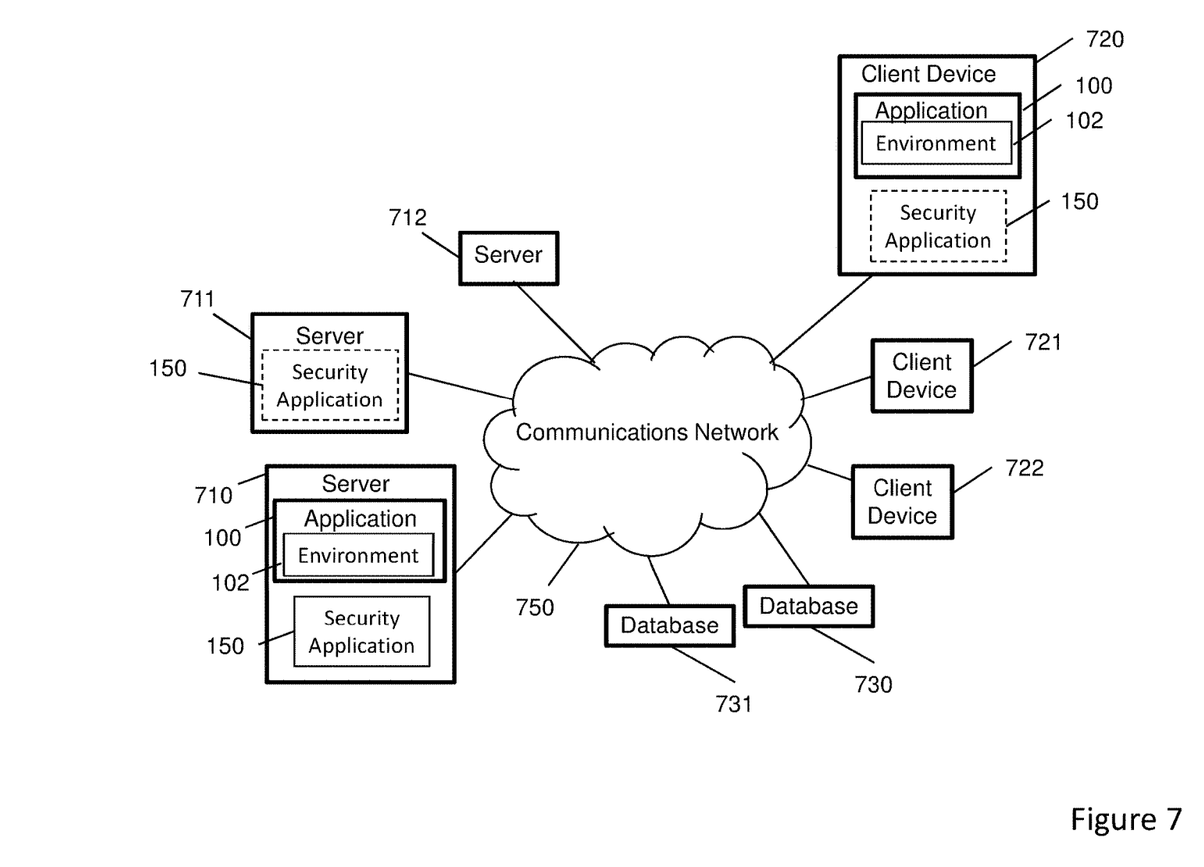
FIG. 7 is an exemplary client-server environment for executing embodiments of the bypass application to implement a security bypass environment.

FIG. 7 is a block diagram of an exemplary client-server environment 700 configured and/or programmed to implement one or more embodiments of the environment 102 generated by the application 100. The environment 700 includes servers 710-712 operatively coupled to clients 720-722, via a communication network 750, which can be any network over which information can be transmitted between devices communicatively coupled to the network. For example, the communication network 750 can be the Internet, Intranet, virtual private network (VPN), wide area network (WAN), local area network (LAN), and the like. The environment 700 can include repositories or database devices 730, 731, which can be operatively coupled to the servers 710-712, as well as to clients 720-722, via the communications network 750. The servers 710-712, clients 720-722, and database devices 730, 731 can be implemented as computing devices. Those skilled in the art will recognize that the database devices 730, 731 can be incorporated into one or more of the servers 710-712 and/or clients 720-722 such that one or more of the servers can include databases.

In some embodiments, the application 100 can be implemented by a single device, e.g., the server 710 or client 720, and can be accessed by other devices on the network 750, e.g., the servers 711-712 and/or clients 721-722. In some embodiments, the application 100 can be distributed among different devices (e.g., servers, clients, databases) in the communication network 750 such that one or more components of the application 100, or portions thereof, can be implemented by different devices in the communication network 750.

In an exemplary operation, the devices on the communications network (e.g., servers 710-712, clients 720-722, databases 730-731) can be governed by an enterprise security application 150, which can be implemented by servers 710, 711, and/or client 720. In the present embodiment, the application 100 can reside on the server 710 and can be remotely executed by clients 720-722 via the communications network 750. Upon execution of the application 100 by, for example, the client 720, the application 100 can implement the user interface 110 to render the GUI 112 on a display device of the client 720 and can generate the environment 102. A user interacting with the client 720 can submit a request including one or more operations to be performed and a passcode, as described herein, through the GUI 112, which can be processed in the environment 102 generated by the application 100. Upon processing the request, the application 100 can instruct the server 710 to perform one or more access controls. For example, the application 100 can instruct the server to construct a query to retrieve a stored passcode associated with the user of the client 720 from the database 730 and compare the passcode included in the request with the stored passcode. Additional access controls can be performed as described herein. Upon satisfaction of the access controls, the one or more operations included in the request can be performed by the server 710 and/or the client 720. For example, the user can install and/or execute one or more untrusted software applications through the environment 102 using a processing device associated with the server 710 and/or the client 720.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A method of installing or executing a software application in a computing environment governed by a security application, the method comprising:

executing a security bypass environment generated by a security bypass application, in a computing environment governed by the security application that prohibits installation or execution of untrusted software applications;

installing or executing an untrusted software application in the computing environment via the security bypass environment and bypassing the security application in response to satisfaction of access control criteria associated with one or more access control procedures applied to the untrusted software application or a user associated with installation or execution of the untrusted software application; and wherein, the security application identifies the security bypass environment as a trusted application based on a digital certificate received from the security bypass application and the untrusted software application is installed through or executed in the security bypass environment such that the untrusted software application inherits security rights and permissions of the security bypass environment after the access control procedures are satisfied.

2. The method of claim 1, wherein executing a security bypass environment comprises executing a trusted software application subject to permission from a security application, the trusted software application providing the security bypass environment for bypassing the security application.

3. The method of claim 2, further comprising receiving a request to install or execute the untrusted software application via the security bypass environment provided by the trusted software application, the request including the information associated with the user or the untrusted software application to be installed or executed in the computing environment.

4. The method of claim 2, wherein the trusted software is included in a whitelist associated with the security application.

5. The method of claim 1, wherein the one or more access control procedures comprises scanning code associated with the operation for viruses in response to the request.

6. The method of claim 1, wherein the one or more access control procedures comprises:
   determining an identity of the user; and
   comparing a passcode included in the request with a stored passcode corresponding to the identified user.

7. The method of claim 1, wherein each time installation or execution of the untrusted software application is performed, the installation or the execution of the untrusted software application is required to be performed through the security bypass environment.

8. The method of claim 1, wherein installation or execution of the untrusted software application is prohibited by the security application outside of the security bypass environment.

9. The method of claim 1, wherein installation or execution of the untrusted software application is terminated in response to termination of security bypass environment.

10. The method of claim 1, wherein the computing environment includes a server and a client device, the server operatively coupled to a client device is configured to execute the security bypass environment and perform the execution or installation of the untrusted software application on the client device.

11. A system for performing an operation in a computing environment, the system comprising:
   a computing environment including a plurality of computing devices configured to be communicatively coupled to each other via a communications network, the computing environment being governed by a security application; and
   a processing device associated with one of the computing devices, the processing device being programmed to execute instructions from memory to:
      create a security bypass environment using a security bypass application, in a computing environment governed by the security application that prohibits installation or execution of untrusted software applications;
      install or execute of the untrusted software application in the computing environment via the security bypass environment and bypassing the security application in response to satisfaction of access control criteria associated with the one or more access control procedures; and
      wherein, the security application identifies the security bypass environment as a trusted application based on a digital certificate received from the security bypass application and the untrusted software application is installed through or executed in the security bypass environment such that the untrusted software application inherits security rights and permissions of the security bypass environment after the access control procedures are satisfied.

12. The system of claim 11, wherein the processing device is programmed to execute instructions from memory to execute a security bypass environment by executing a trusted software application subject to permission from a security application, the trusted software application providing the security bypass environment for bypassing the security application.

13. The system of claim 12, wherein the processing device is programmed to execute instructions from memory to receive a request to install or execute the untrusted software application via the security bypass environment provided by the trusted software application, the request including the information associated with a user or the portion of an untrusted software application to be installed or executed in the computing environment.

14. The system of claim 11, wherein the one or more access control procedures comprises scanning code associated with the operation for viruses in response to the request.

15. The system of claim 11, wherein the one or more access control procedures comprises:
   determining an identity of the user; and
   comparing a passcode included in the request with a stored passcode corresponding to the identified user.

16. The system of claim 11, wherein each time installation or execution of the untrusted software application is performed, the installation or the execution of the untrusted software application is required to be performed through the security bypass environment.

17. The system of claim 11, wherein the computing environment includes a server and a client device, the server operatively coupled to a client device is configured to execute the security bypass environment and perform the execution or installation of the untrusted software application on the client device.

18. A non-transitory computer-readable storage device configured to store instruction executable by a processing device comprising:
   executing a security bypass environment generated by a security bypass application, in a computing environment governed by the security application that prohibits installation or execution of untrusted software applications;
   installing or executing an untrusted software application in the computing environment via the security bypass environment and bypassing the security application in response to satisfaction of access control criteria associated with one or more access control procedures applied to the untrusted software application or a user associated with installation or execution of the untrusted software application; and
   wherein, the security application identifies the security bypass environment as a trusted application based on a digital certificate received from the security bypass application and the untrusted software application is installed through or executed in the security bypass environment such that the untrusted software application inherits security rights and permissions of the security bypass environment after the access control procedures are satisfied.

19. The medium of claim 18, wherein the one or more access control procedures comprises scanning code associated with the operation for viruses in response to the request.

20. The medium of claim 18, wherein the one or more access control procedures comprises:
- determining an identity of the user; and
- comparing a passcode included in the request with a stored passcode corresponding to the identified user.

21. The medium of claim 18, wherein each time installation or execution of the untrusted software application is performed, the installation or execution of the untrusted software application is required to be performed through the security bypass environment.

22. The medium of claim 18, wherein installation or execution of the untrusted software application is prohibited by the security application outside of the security bypass environment.

23. The medium of claim 18, wherein installation or execution of the untrusted software application is terminated in response to termination of security bypass environment.

24. The medium of claim 18, wherein the computing environment includes a server and a client device, the server operatively coupled to a client device is configured to execute the security bypass environment and perform the execution or installation of the untrusted software application on the client device.

* * * * *